United States Patent
Park (10) Patent No.: US 10,755,577 B2
(45) Date of Patent: Aug. 25, 2020

(54) APPARATUS AND METHOD FOR AVOIDING BLIND SPOT OF NEXT-LANE VEHICLE

(71) Applicant: MANDO CORPORATION, Pyeongtaek-si, Gyeonggi-do (KR)

(72) Inventor: JiYeol Park, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/421,802

(22) Filed: May 24, 2019

(65) Prior Publication Data

US 2020/0111368 A1    Apr. 9, 2020

(30) Foreign Application Priority Data

Oct. 8, 2018 (KR) .......................... 10-2018-0120045

(51) Int. Cl.
*G08G 1/16* (2006.01)
*B60W 30/095* (2012.01)

(52) U.S. Cl.
CPC ......... *G08G 1/167* (2013.01); *B60W 30/0956* (2013.01); *B60W 2554/4041* (2020.02)

(58) Field of Classification Search
None
See application file for complete search history.

(56) References Cited

U.S. PATENT DOCUMENTS 9,495,874 B1 * 11/2016 Zhu ........................ G08G 1/165
9,522,676 B2 * 12/2016 Nespolo ............ B60W 30/0953

FOREIGN PATENT DOCUMENTS

| KR | 10-2013-0143272 A | 12/2013 |
| KR | 10-2013-0067651 A | 6/2016 |
| KR | 10-1803745 B1 | 12/2017 |
| KR | 10-2018-0094823 A | 8/2018 |

OTHER PUBLICATIONS

Notice of Allowance issued in Korean Patent Application No. 10-2018-0120045 dated Feb. 22, 2019, with English translation.
Office Action issued in Korean Patent Application No. 10-2018-0120045 dated Nov. 12, 2018, with English translation.

* cited by examiner

*Primary Examiner* — Richard M Camby
(74) *Attorney, Agent, or Firm* — Morgan, Lewis & Bockius LLP (57) ABSTRACT

Embodiments of the present disclosure can determine whether a subject vehicle is in a blind spot of a next-lane vehicle on the basis of the result of sensing a next-lane vehicle and the result of detecting the length of the next-lane vehicle using a plurality of side sensors that senses objects in front-cross, central side, and rear-cross areas of the subject vehicle, and can control the subject vehicle to drive while avoiding the blind spot of the next-lane vehicle, so it can help safe driving.

12 Claims, 8 Drawing Sheets

: BLIND SPOT

FIG.3B

: BLIND SPOT

FIG.4A

: BLIND SPOT

| LENGTH OF NEXT-LANE VEHICLE | FRONT-CROSS SENSOR | CENTRAL SIDE SENSOR | REAR-CROSS SENSOR | POSITION OF SUBJECT VEHICLE (INSIDE/OUTSIDE BLIND SPOT OF NEXT-LANE VEHICLE) | |
|---|---|---|---|---|---|
| CRITERION LENGTH($L_S$) OR LESS | OFF | OFF | OFF | 外 | |
| | ON | OFF | OFF | 外 | |
| | ON | ON | OFF | 內 | ← FIRST CONDITION |
| | ON | ON | ON | 外 | |
| OVER CRITERION LENGTH($L_S$) | OFF | OFF | OFF | 外 | |
| | ON | OFF | OFF | 外 | |
| | ON | ON | OFF | 外 | |
| | ON | ON | ON | 內 | ← SECOND CONDITION |

FIG.6

APPARATUS AND METHOD FOR AVOIDING BLIND SPOT OF NEXT-LANE VEHICLE

CROSS REFERENCE TO RELATED APPLICATION

This application claims priority from Korean Patent Application No. 10-2018-0120045, filed on Oct. 8, 2018, which is hereby incorporated by reference for all purposes as if fully set forth herein.

BACKGROUND OF THE INVENTION

1. Field of the Invention

Embodiments relate to a technology of avoiding a blind spot of a next-lane vehicle.

2. Description of the Prior Art

In general, drivers determine traffic situations while driving, particularly, they have to appropriately recognize surrounding vehicles.

However, there is a problem that drivers can see only limited areas due to the structural limits of vehicles. The limited areas mean blind spots, which are areas that cannot be seen excepting side areas that driver can see through side mirrors and side areas that driver can see by turning their heads.

A Blind Spot Detection (BSD) system that assists drivers to recognize blind spots using sensors has been developed, but not all vehicles are equipped with the BSD system. Accordingly, there may be still a problem that even if a subject vehicle is equipped with a BSD system, a next-lane vehicle not equipped with a BSD system may attempt to change lanes without recognizing the subject vehicle due to the next-lane vehicle's blind spot.

Therefore, it is required to control a vehicle to drive while avoiding blind spots of next lanes.

SUMMARY OF THE INVENTION

In this background, an aspect of the present disclosure is to provide an apparatus and method for avoiding a blind spot of a next-lane vehicle, the apparatus and method being able to control a vehicle to drive while avoiding a blind spot of a next-lane vehicle.

In accordance with an aspect of the present disclosure, there is provided an apparatus for avoiding of a blind spot of a next-lane vehicle. The apparatus comprises: a plurality of side sensors that each comprises a non-image sensor disposed on a subject vehicle to have a sensing area outside the subject vehicle and to capture sensing data and composed of at least one of a radar sensor, a lidar sensor, and an ultrasonic sensor, and at least one processor configured to process sensing data captured by the non-image sensor, and that senses objects in front-cross, central side, and rear-cross areas of the subject vehicle; a vehicle length detector that comprises an image sensor disposed on the subject vehicle to have a visual field outside the subject vehicle and configured to capture image data, and a processor configured to process image data captured by the image sensor, and that detects the length of a next-lane vehicle driving in a next lane of the subject vehicle; and a control unit that is configured to control the speed of the subject vehicle at least partially on the basis of processing of the image data and the sensing data, in which the control unit comprises: a determiner that determines whether the subject vehicle is in a blind spot of the next-lane vehicle on the basis of the sensing result of the side sensors and the detection result of the vehicle length detector; and a controller that decelerates the subject vehicle on the basis of the determining result of the determiner.

In accordance with another aspect of the present disclosure, there is provided an apparatus for avoiding of a blind spot of a next-lane vehicle. The apparatus comprises: a plurality of side sensors that each comprises a non-image sensor disposed on a subject vehicle to have a sensing area outside the subject vehicle and to capture sensing data and composed of at least one of a radar sensor, a lidar sensor, and an ultrasonic sensor; a vehicle length detector that comprises an image sensor disposed on the subject vehicle to have a visual field outside the subject vehicle and configured to capture image data; and a domain control unit that is configured to sense objects in front-cross, central side, and rear-cross areas of the subject vehicle, to detect the length of a next-lane vehicle driving in a next lane of the subject vehicle, and to control at least one driver assist system in the subject vehicle, at least partially on the basis of processing of the image data and the sensing data, in which the domain control unit determines whether the subject vehicle is in a blind spot of the next-lane vehicle on the basis of the sensing results of the side sensors and the detection result of the vehicle length detector, and decelerates the subject vehicle on the basis of the determining result.

In accordance with an aspect of the present disclosure, there is provided an image sensor disposed on a subject vehicle to have a visual field outside the subject vehicle and configured to capture image data, in which the image data is processed by a processor and is then used to detect objects in front-cross, central side, and rear-cross areas of the subject vehicle and to detect the length of a next-lane vehicle driving in a next lane of the subject vehicle, and length detection information of the next-lane vehicle is used to determine whether the subject vehicle is in a blind spot of the next-lane vehicle and to decelerate the subject vehicle on the basis of the determining result.

In accordance with an aspect of the present disclosure, there is provided a method of avoiding a blind spot of a next-lane vehicle. The method comprises: sensing a next-lane vehicle driving in a next lane of a subject vehicle, using a plurality of side sensors that senses objects in front-cross, central side, and rear-cross areas of the subject vehicle; detecting the length of the next-lane vehicle; determining whether the subject vehicle is in a blind spot of the next-lane vehicle on the basis of the sensing results of the side sensors and the result of detecting the length of the next-lane vehicle; and decelerating the subject vehicle on the basis of the detection result.

According to embodiments, it is possible to control a vehicle to drive while avoiding a blind spot of a next-lane vehicle, so it is possible to help safe driving.

Since it is possible to control a vehicle in consideration of blind spots that depend on the lengths of next-lane vehicles, using the embodiments, it is possible to drive while avoiding blind spots regardless of the types of next-lane vehicles.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, some embodiments will be described with reference to the accompanying illustrative drawings. However, it should be understood that the present disclosure is not limited to the specific embodiments, but includes all modifications and changes, equivalents, and alternatives within the spirit and the scope of the present disclosure. Further, in the description of the present disclosure, when it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

In the following description of the present embodiments, the same or similar elements are provided with the same reference signs, and a repetitive description thereof will be omitted.

Terms to be used below are defined as follows, prior to description referring to drawings.

A subject vehicle is a vehicle equipped with an apparatus for avoiding a blind spot a next-lane vehicle according to an embodiment. A next lane is a lane adjacent to the lane of a subject vehicle and includes a left next lane and a right next lane.

A preceding vehicle is a vehicle driving ahead of a subject vehicle in the same lane as the subject vehicle and a next-lane vehicle is a vehicle driving in a next lane of a subject vehicle. A following distance is a distance between a preceding vehicle and a subject vehicle.

Figure 1:
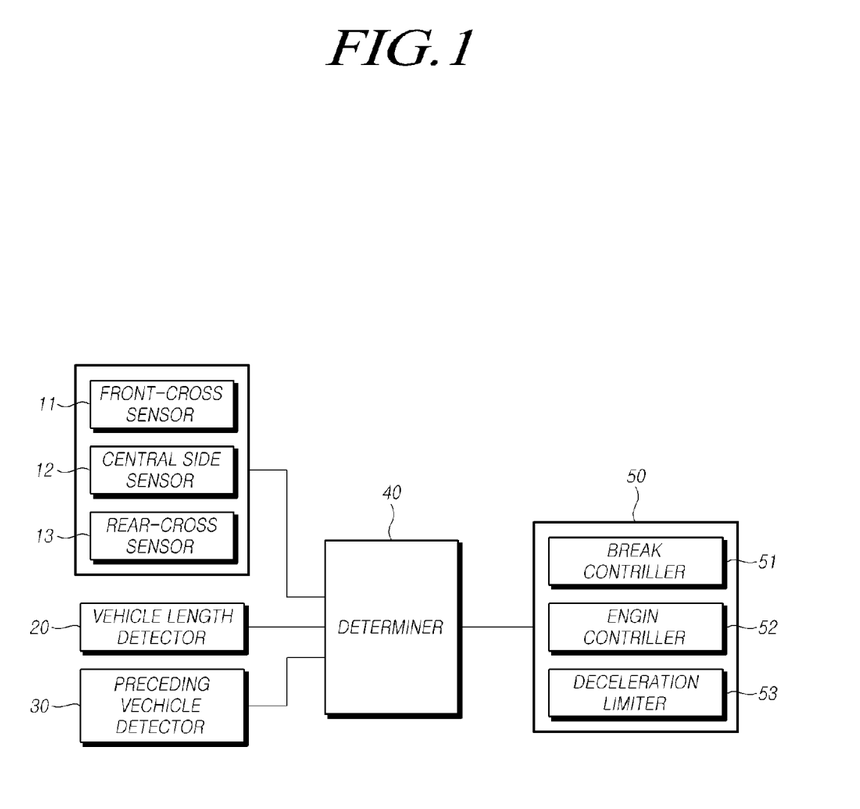
FIG. 1 is a block diagram showing an apparatus for avoiding a blind spot of a next-lane vehicle according to an embodiment.
Figure 2:
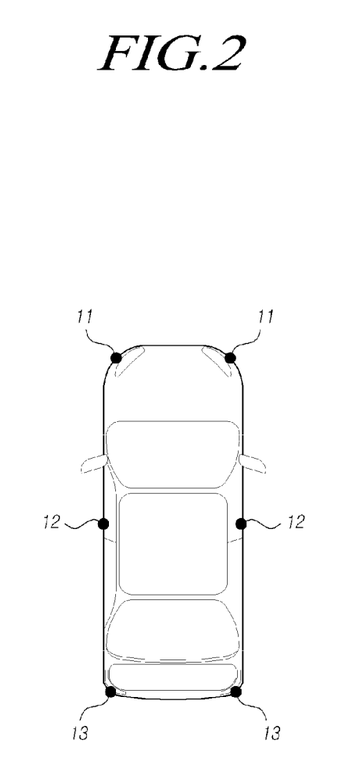
FIG. 2 is a view showing an example of a vehicle equipped with an apparatus for avoiding a blind spot of a next-lane vehicle according to an embodiment.

FIG. 1 is a block diagram showing an apparatus for avoiding a blind spot of a next-lane vehicle according to an embodiment and FIG. 2 is a view showing an example of a vehicle equipped with an apparatus for avoiding a blind spot of a next-lane vehicle according to an embodiment.

Referring to FIGS. 1 and 2, an apparatus for avoiding a blind spot of next lanes of a vehicle according to an embodiment may include: a plurality of side sensors 11~13 that senses next-lane vehicles driving in next lanes of a subject vehicle; a vehicle length detector 20 that detects the lengths of next-lane vehicles; a preceding vehicle detector 30 that senses a preceding vehicle in front of the subject vehicle and detects the relative speed of the preceding vehicle and the following distance between the subject vehicle and the preceding vehicle; a determiner 40 that determines whether the subject vehicle is in a blind spot of a target vehicle on the basis of the sensing result of the side sensors 11~13 and the detection result of the vehicle length detector 20; and a controller 50 that decelerates the subject vehicle on the basis of the determining result of the determiner 40.

The side sensors 11~13 are disposed on the sides of the subject vehicle 100 and include front-cross sensors 11, central side sensors 12, and rear-cross sensors 13. The side sensors 11~13 may include a plurality of non-image sensors disposed on a vehicle to sense the front, rear, and side areas of a vehicle and capturing sensing data. The non-image sensors, for example, may be radars, lidars, and ultrasonic sensors.

A radar sensor or a radar system that is used in the present disclosure may include at least one radar sensor unit, for example, one or more of a front radar sensor disposed on the front of a vehicle, a rear radar sensor disposed on the rear of the vehicle, and a side or rear-cross radar sensor disposed on the sides of a vehicle. The radar sensor or radar sensor system processes data by analyzing transmission signals or reception signals, so it can detect information about objects and may include an Electronic Control Unit (ECU) or a processor for the detection. A communication link such as an appropriate automotive network bus may be used for data or signal transmission from the radar sensor to the ECU.

The radar sensor includes one or more transmitting antennas that transmit radar signals and one or more receiving antennas that receive reflection signals received from an object.

The radar antenna according to the embodiment may employ a multi-antenna arrangement and Multiple Input Multiple Output (MIMO) signal transmission/reception method to form a virtual antenna aperture larger than the actual antenna aperture.

For example, a 2D-antenna array is used to secure precision and resolution of horizontal and vertical angles. By using a 2D-radar antenna array, it is possible to transmit/receive signals through two-time separate (time-multiplexed) horizontal and vertical scanning and to use MIMO separately from 2D-radar horizontal and vertical scanning (time multiplexing).

In detail, the radar sensor of the embodiment may employ a 2D-antenna array composed of a transmitting antenna unit including a total of twelve transmitting antennas Tx and a receiving antenna unit including a total of sixteen receiving antennas Rx, and as a result, it may have a total of one hundred and ninety two virtual receiving antennas.

The transmitting antennal unit includes three transmitting antenna groups each including four transmitting antennas, in which a first transmitting antenna group may be vertically spaced apart a predetermined distance from a second transmitting antenna group and the first or second transmitting antenna group may be horizontally spaced apart a predetermined distance D from a third transmitting antenna group.

The receiving antenna unit may include four receiving antenna groups each including four receiving antennas, in which the antenna groups are vertically spaced apart from one another. Further, the receiving antenna unit may be disposed between the horizontally spaced first and third transmitting antenna groups.

In another embodiment, antennas of the radar sensor are arranged in a 2D-antenna array, and for example, each antenna patch has Rhombus arrangement, thereby being able to reduce unnecessary lobes.

Alternatively, the 2D-antenna arrangement may include a V-shape antenna array in which a plurality of radial patches are arranged in a V-shape, and in detail, may include two V-shape antenna arrays. In this configuration, a single feed is achieved by the apex of each V-shape antenna array.

Alternatively, the 2D-antenna arrangement may include an X-shape antenna array in which a plurality of radial patches are arranged in an X-shape, and in detail, may include two X-shape antenna arrays. In this configuration, a single feed is achieved by the center of each X-shape antenna array.

A MIMO antenna system may be used for the radar sensor according to the embodiment to secure vertical and horizontal sensing accuracy or resolution.

In detail, in a MIMO system, each of transmitting antennas can transmit signals that have independent different waveforms. That is, the transmitting antennas each transmit a signal having an independent waveform different from those of the other transmitting antennas, so receiving antennas can determine which transmitting antennas reflection signals reflected by an object are transmitted from due to the different waveforms of the signals.

The radar sensor according to the embodiment may include a substrate including a transmitting/receiving antenna, a radar housing accommodating a circuit, and a radome forming the external shape of the radar housing. The radome is made of a material that can reduce attenuation of transmitted and received radar signals and may be formed as a front or rear bumper, a grill, of a side body of a vehicle, or the outer surface of an automotive part.

That is, the radome of the radar sensor may be disposed inside a grill, a bumper, or a body of a vehicle or may be formed as a portion of a part forming the outer surface of a vehicle such as a grill, a bumper, and a portion of the body of a vehicle, thereby being able to improve the aesthetic appearance of the vehicle and convenience of mounting the radar sensor.

The lidar may include a laser transmitter, a receiver, and a processor. The lidar may be implemented in a Time of Flight (TOF) type or a phase-shift type.

A TOF type lidar emits a laser pulse signal and receives a reflection pulse signal reflected by an object. The TOF type lidar can measure the distance to an object on the basis of the emission time of a laser pulse signal and the reception time of a reflection pulse signal. Further, the lidar can measure a relative speed to the object on the basis of a change in distance to time.

A phase-shift type lidar can emit a laser beam that is continuously modulated with a specific frequency and can measure time and the distance to an object on the basis of a change in phase of a signal reflected back by an object. The phase-shift type lidar can measure a relative speed to the object on the basis of a change in distance to time.

A lidar can detect an object on the basis of a transmitted laser and can detect a relative speed and the distance to the detected object. When the object is a static object (e.g., a street tree, a street light, a traffic light, and a traffic sign), the lidar can detect the running speed of a vehicle on the basis of TOF by the object.

The ultrasonic sensor may include an ultrasonic transmitter, a receiver, and a processor.

An ultrasonic sensor can detect an object on the basis of a transmitted ultrasonic wave and can detect a relative speed and the distance to the detected object. When the object is a static object (e.g., a tree, a street light, a traffic light, and a traffic sign), the ultrasonic sensor can detect the running speed of a vehicle on the basis of TOF by the object.

The front-cross sensors 11, which are provided to detect objects in the front-cross areas of the subject vehicle 100, may be mounted on a front fender of the subject vehicle 100.

The central side sensors 12, which are provided to detect objects in the central side areas of the subject vehicle 100, may be mounted on a center pillar of the subject vehicle 100. The rear-cross sensors 13, which are provided to detect objects in the rear-cross areas of the subject vehicle 100, may be mounted on a rear fender of the subject vehicle 100. The front-cross sensors 11, the central side sensors 12, and the rear-cross sensors 13 may be disposed on the left side and the right side of the subject vehicle 100.

Although three side sensors 11~13 are disposed on each of the left side and the right side of the subject vehicle 100 in the embodiment shown in FIGS. 1 and 2, the present disclosure is not limited thereto. The present disclosure may include all cases in which the sensors are disposed on at least three portions including the front, the rear, and the center of each of the left side and the right side of the subject vehicle 100.

Radar sensors or ultrasonic sensors that are generally used in a Smart Parking Assist System (SPAS) may be used as the side sensors 11~13. The radar sensor and the ultrasonic sensor are just examples and any sensors can be used as the side sensors 11~13 as long as they can sense objects in the front.

The vehicle length detector 20 may include an image sensor disposed on a vehicle to have a visual field outside the vehicle and configured to capture image data and a processor configured to process the image data captured by the image sensor. At least one image sensor can be mounted at a predetermined position on the vehicle to secure visual fields for the front, side, and rear areas of the vehicle. According to an embodiment, the image sensor and the processor may be implemented in one camera sensor.

Image information obtained from the image sensor is configured in image data, so it may mean image data captured by the image sensor. In the present disclosure, the image information taken from the image sensor means image data captured by the image sensor. The image data captured by the image sensor, for example, may be produced in one format of AVI of a Raw format, MPEG-4, H.264, DivX, and JPEG. The image data captured by the image sensor can be processed by the processor.

The image sensor may be disposed on the subject vehicle to secure a visual field outside the subject vehicle and capture image data. The image data captured by the image sensor is processed by the processor and is then be used to detect objects in the front-cross, central side, and rear-cross areas of the subject vehicle and to detect the length of a next-lane vehicle driving in a next lane of the subject vehicle. Length detection information of the next-lane vehicle can be used to determine whether the subject vehicle is a blind spot of the next-lane vehicle and to decelerate the subject vehicle on the basis of the determining result.

The processor can be operated to process the image data captured by the image sensor. The processor can be achieved by at least one of electric units that can process image data and perform other functions such as Application Specific Integrated Circuits (ASICs), Digital Signal Processors (DPSs), Digital Signal Processing Devices (DSPDs), Programmable Logic Devices (PLDs), Field Programmable Gate Arrays (FPGAs), processors, controllers, micro-controllers, and microprocessors.

The vehicle length detector 20 can detect the length of a next-lane vehicle. A camera may be used as the vehicle length detector 20. The camera can take a picture of a next-lane vehicle and can obtain length information of the next-lane vehicle from the taken picture using an image processing algorithm. The camera may be mounted at an appropriate position on the outer side of the subject vehicle to take a picture of a next-lane vehicle. The camera may be a mono camera, a stereo camera, an Around View Monitoring (AVM) camera, and a 360-degree camera. The camera is an example and any devices can be used as the vehicle length detector 20 as long as they can sense the length of a next-lane vehicle.

The preceding vehicle detector 30 can detect a preceding vehicle in front of the subject vehicle and detect the relative speed of the sensed preceding vehicle and the following distance between the subject vehicle and the preceding vehicle. The preceding vehicle detector 30 may be at least one of an ultrasonic sensor, a radar, and a camera.

A control unit can control the general operation of the apparatus for avoiding a blind spot of a next-lane vehicle. In accordance with an example, the control unit may be an electronic control unit (ECU). The control unit can receive a processing result of image data from the processor. The control unit may be configured to control the speed of the subject vehicle at least partially on the basis of image data processing. The control unit may include: a determiner that determines whether the subject vehicle is in a blind spot of a next-lane vehicle on the basis of the sensing results of the side sensors and the detection result of the vehicle length detector; and a controller that decelerates the subject vehicle on the basis of the determining result of the determiner.

The determiner 40 can determine whether the subject vehicle is in a blind spot of a next-lane vehicle on the basis of the sensing results of the side sensors 11~13 and the detection result of the vehicle length detector 20.

In detail, the determiner 40 compares the length of a next-lane vehicle detected by the vehicle length detector 20 with a criterion length $L_s$ and can determine that the next-lane vehicle is a first-class vehicle when the length of the next-lane vehicle detected by the vehicle length detector 20 is the criterion length $L_s$ or less, the next-lane vehicle is a second-class vehicle when it is larger than the criterion length $L_s$.

The second-class vehicle is a vehicle that is significantly longer than the subject vehicle and the first-class vehicle is a vehicle except for the second-class vehicle.

The criterion length $L_s$ is a reference for determining whether a next-lane vehicle is significantly longer than the subject vehicle, and may be the sum of the length of the subject vehicle and a predetermined length $\Delta L$ ($\Delta L>0$). The predetermined length $\Delta L$ may have a magnitude that is experimentally determined.

The reason of classifying next-lane vehicles in accordance with lengths is because the subject vehicle may be or may not be in blind spots of the next-lane vehicles, depending on the lengths of the next-lane vehicles, even if the sensing results of the side sensors 11~13 are the same. This will be described below with reference to FIGS. 3A to 4B.

The determiner 40 can determine whether the subject vehicle is in a blind spot of the next-lane vehicle on the basis of the sensing results of the side sensors 11~13 and the type of the next-lane vehicle.

When the determiner 40 determines that the subject vehicle is in a blind spot of a next-lane vehicle, the controller 50 can decelerate the subject vehicle. The controller 50 may include a brake controller 51, an engine controller 52, and a deceleration limiter 53.

The brake controller 51 can decelerates a vehicle by operating a brake system that generates a braking force for vehicle. When the determiner 40 determines that the subject vehicle is in a blind spot of a next-lane vehicle, the brake controller 51 can decelerate the subject vehicle by controlling the brake system of the subject vehicle.

The engine controller 52 can accelerate a vehicle by controlling an engine that provides propulsion for the vehicle.

The deceleration limiter 53 compares the following distance between the subject vehicle and a preceding vehicle detected by the preceding vehicle detector 30, and can limit the operation of the brake controller 51 to decelerate the subject vehicle only when the following distance detected by the preceding vehicle detector 30 is a maximum allowable following distance or less.

A large-vehicle approach warning system 10 according to the present disclosure includes: an image detector that includes an image sensor disposed on a subject vehicle to have a visual field outside the subject vehicle and configured to capture image data; a speed/distance detector that including a non-image sensor disposed on the subject vehicle to have a sensing area outside the subject vehicle and configured to capture sensing data; a steering wheel grip torque detector that detects steering wheel grip torque of the subject vehicle; a Domain Control Unit (DCU) that obtains an image of a rear-cross area of the subject vehicle and recognize a target vehicle in the rear-cross area of the subject vehicle at least partially on the basis of processing of the image data and the sensing data, detects relative speed and a relative distance to the recognized target vehicle, and controlling at least one driver assist system in the subject vehicle; and a warning generator that is controlled by the DCU to output a warning message.

In accordance with an example, the processor that processes image data described above, the control unit, and the control unit of various devices in a vehicle can be integrated into one DCU. In this case, the DCU can control a driver assist system in a vehicle and various relevant devices in the vehicle by producing various vehicle control signals.

The DCU can determine approach of a large vehicle on the basis of the obtained image and the detected relative speed and relative distance, determine whether a driver holds a steering wheel on the basis of the detected steering wheel grip torque, and control output of a warning message in accordance with the determining result. For this processing, the DCU may include at least one processor.

The DCU can be disposed in a vehicle and can communicate with at least one image sensor and at least one non-image sensor in the vehicle. To this end, an appropriate data link or communication link such as a vehicle network bus for data transmission or signal communication may be further included.

The DCU can be operated to control one or more of several Driver Assist Systems (DAS) that are used for vehicles. The DCU can control DASs such as a Blind Spot Detection (BSD) system, an Adaptive Cruise Control (ACC) system, a Lane Departure Warning System (LDWS), a Lane Keeping Assist System (LKAS), and a Lane Change Assist System (LCAS) on the basis of sensing data captured by a plurality of non-image sensors and image data captured by an image sensor.

The DCU can determine whether the subject vehicle is in a blind spot of a next-lane vehicle on the basis of the sensing results of the side sensors 11~13 and the detection result of the vehicle length detector 20.

In detail, the DCU compares the length of a next-lane vehicle detected by the vehicle length detector 20 with a reference length $L_s$ and can determine that the next-lane vehicle is a first-class vehicle when the length of the next-lane vehicle detected by the vehicle length detector 20 is the reference length $L_s$ or less, the next-lane vehicle is a second-class vehicle when it is larger than the reference length $L_s$.

The second-class vehicle is a vehicle that is significantly longer than the subject vehicle and the first-class vehicle is a vehicle except for the second-class vehicle.

The criterion length $L_s$ is a reference for determining whether a next-lane vehicle is significantly longer than the subject vehicle, and may be the sum of the length of the subject vehicle and a predetermined length $\Delta L$ ($\Delta L>0$). The predetermined length $\Delta L$ may be experimentally determined.

The reason of classifying next-lane vehicles in accordance with lengths is because the subject vehicle may be or may not be in blind spots of the next-lane vehicles, depending on the lengths of the next-lane vehicles, even if the sensing results of the side sensors 11~13 are the same. This will be described below with reference to FIGS. 3A to 4B.

The DCU can determine whether the subject vehicle is in a blind spot of the next-lane vehicle on the basis of the sensing results of the side sensors 11~13 and the type of the next-lane vehicle.

The DCU can decelerate the subject vehicle when determining that the subject vehicle is in a blind spot of a next-lane vehicle. The DCU can decelerate the subject vehicle by operating a brake system that generates braking force for a vehicle. The DCU can decelerate the subject vehicle by controlling the brake system when determining that the subject vehicle is in a blind spot of a next-lane vehicle.

The DCU can accelerate a vehicle by controlling an engine that provides propulsion for the vehicle.

The DCU compares the following distance between the subject vehicle and a preceding vehicle detected by the preceding vehicle detector 30, and can limit the operation of the brake system to decelerate the subject vehicle only when the following distance detected by the preceding vehicle detector 30 is a maximum allowable following distance or less.

In relation to this configuration, the operation of the apparatus for avoiding a blind spot of a next-lane vehicle will be described in detail with reference to relevant drawings. The following description is based on the determiner 40 and the controller 50 included in the control unit, but is not limited thereto. The following description about the operation of the determiner 40 and the controller 50 can be performed substantially in the same way in a DCU except for non-applicable operation.

Figure 3A:
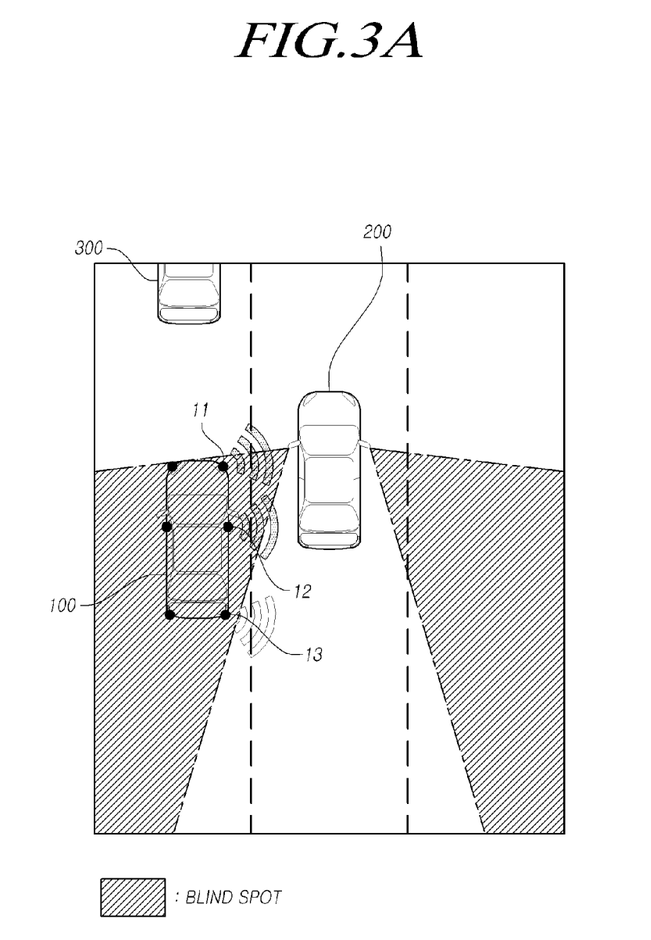
FIGS. 3A and 3B are exemplary views showing sensing results by side sensors according to the position of a subject vehicle when a next-lane vehicle has a length close to that of the subject vehicle.
Figure 3B:
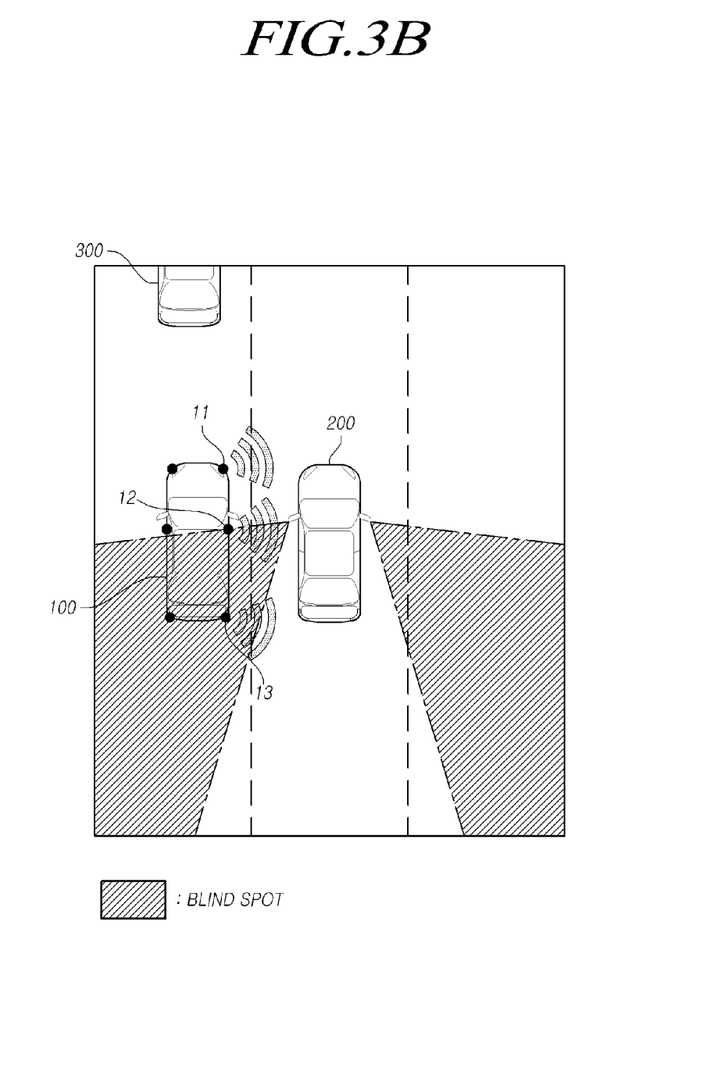
Figure 4A:
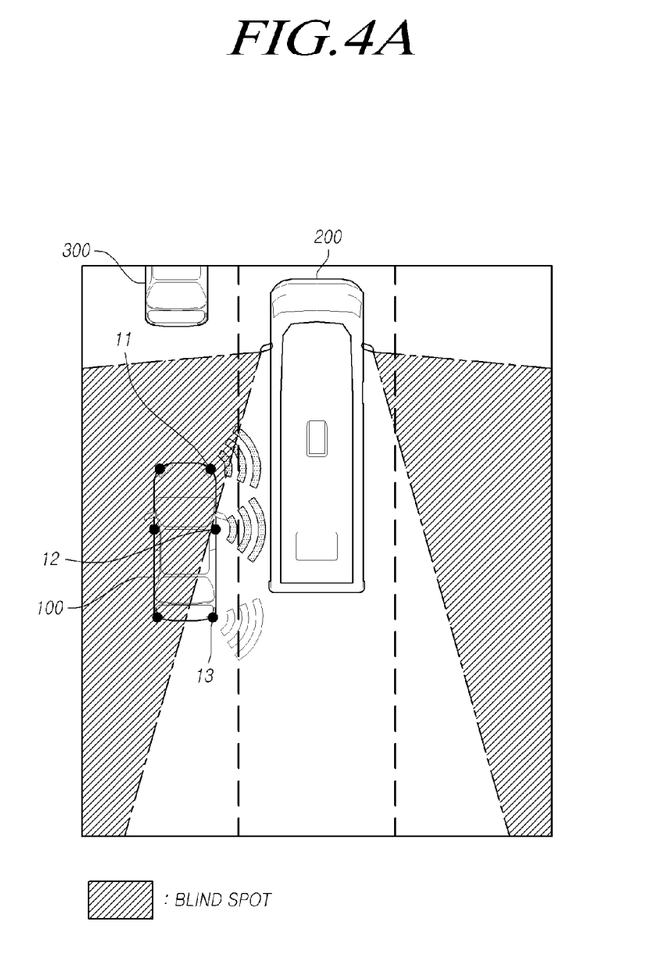
FIGS. 4A and 4B are exemplary views showing sensing results by side sensors according to the position of a subject vehicle when a next-lane vehicle has a length significantly larger than that of the subject vehicle.
Figure 4B:
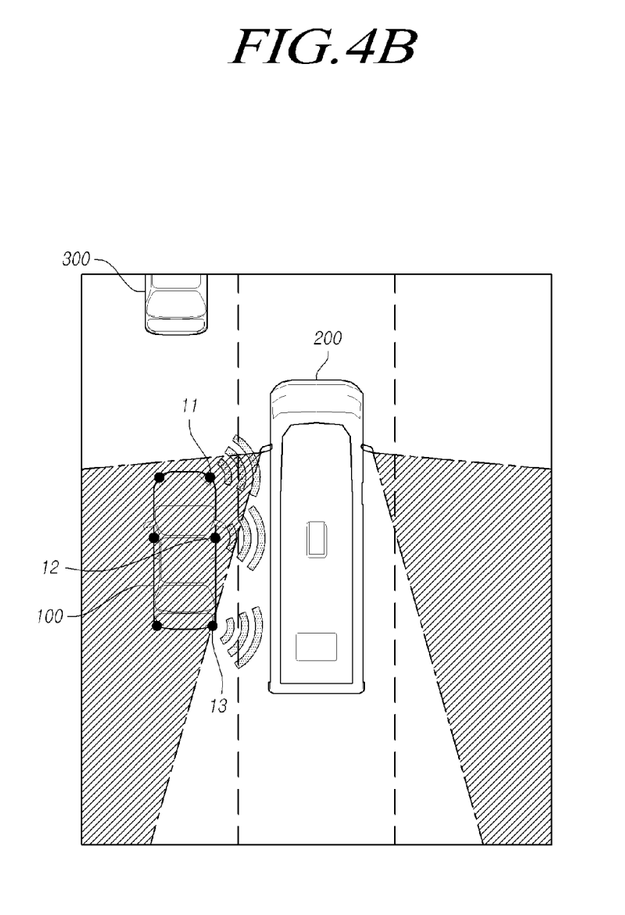

FIGS. 3A and 3B are exemplary views showing sensing results by side sensors according to the position of a subject vehicle when a next-lane vehicle has a length close to that of the subject vehicle and FIGS. 4A and 4B are exemplary views showing sensing results by side sensors according to the position of a subject vehicle when a next-lane vehicle has a length significantly larger than that of the subject vehicle.

Referring to FIG. 3A, in which a next-lane vehicle 200 has a length close to that of a subject vehicle 100, when the front-cross sensors 11 and the central side sensors 12 of the side sensors 11~13 on the sides of the subject vehicle 100 have sensed the next-lane vehicle 200 and the rear-cross sensors 13 have not sensed the next-lane vehicle 200, the subject vehicle 100 would be in a blind spot of the next-lane vehicle 200.

Referring to FIG. 3B, in which a next-lane vehicle 200 has a length close to that of a subject vehicle 100, when all the side sensors 11~13 on the sides of the subject vehicle 100 have sensed the next-lane vehicle 200, the front portion of the subject vehicle 100 would be positioned in an area that the driver of the next-lane vehicle 200 can see by turning his/her head. That is, the subject vehicle 100 would not be in the blind spot of the next-lane vehicle 200.

Referring to FIG. 4A, in which a next-lane vehicle 200 has a length significantly larger than that of a subject vehicle, when the front-cross sensors 11 and the central side sensors 12 of the side sensors 11~13 on the sides of the subject vehicle 100 have sensed the next-lane vehicle 200 and the rear-cross sensors 13 have not sensed the next-lane vehicle 200, the rear portion of the subject vehicle 100 would be in an area that the driver of the next-lane vehicle 200 can see through a side mirror. That is, the subject vehicle 100 would not be in a blind spot of the next-lane vehicle 200.

Referring to FIG. 4B, in which a next-lane vehicle 200 has a length significantly larger than that of a subject vehicle 100, when all the side sensors 11~13 on the sides of the subject vehicle 100 have sensed the next-lane vehicle 200, the subject vehicle 100 would be in a blind spot of the next-lane vehicle 200. Reference numeral '300' shown in FIGS. 3A to 4B but not stated above indicates a preceding vehicle.

As described above with reference to FIGS. 3A to 4B, the subject vehicle 100 may be or may not be in the blind spot of the next-lane vehicle 200, depending on the length of the next-lane vehicle 200, even if the sensing results of the side sensors 11~13 are the same.

In consideration of this fact, a determiner (40 in FIG. 1) according to the embodiment determines whether the subject vehicle 100 is in the blind spot of the next-lane vehicle 200 on the basis of not only the sensing results of the side sensors 11~13, but also the length of the next-lane vehicle 200. Therefore, it is possible to achieve accurate determination regardless of the length of the next-lane vehicle 200.

Figure 5:
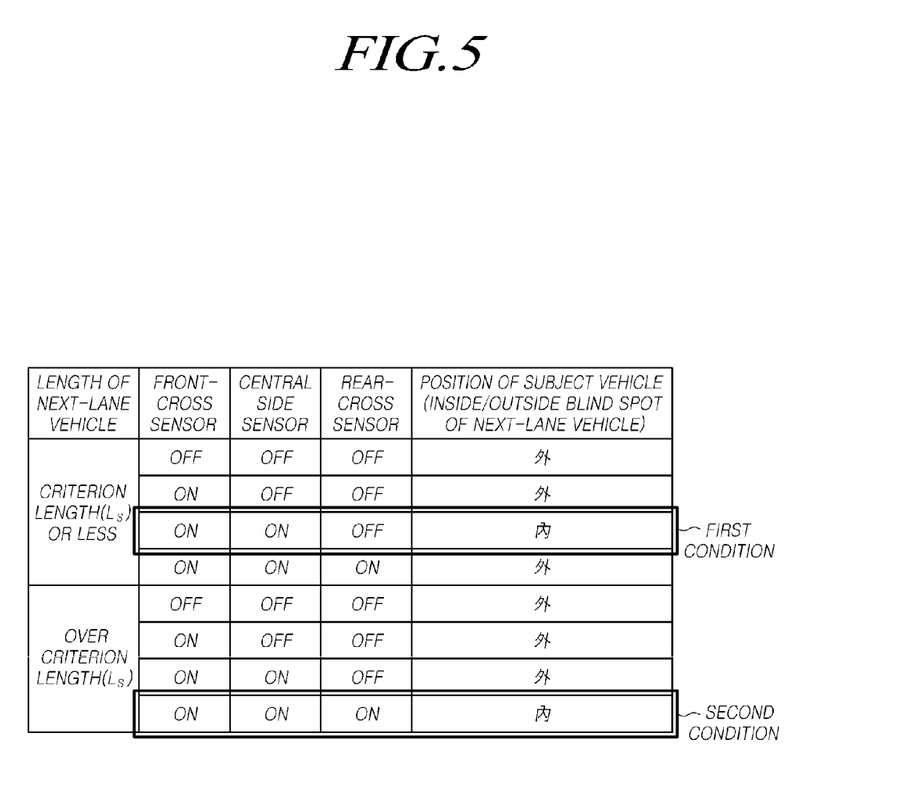
FIG. 5 is a table showing criteria of a determiner.

FIG. 5 is a table showing criteria of a determiner.

Referring to FIG. 5, if a next-lane vehicle is a first-class vehicle having a length equal to smaller than a criterion length $L_s$, a determiner (40 in FIG. 1) determines that a subject vehicle is in a blind spot of the next-lane vehicle when a first condition, in which front-cross sensors (11 in FIG. 2) and central side sensors (12 in FIG. 2) sense the next-lane vehicle and rear-cross sensors (13 in FIG. 2) cannot sense the next-lane vehicle, is satisfied, and determines that the subject vehicle is not in the blind spot of the next-lane vehicle when the first condition is not satisfied.

If a next-lane vehicle is a second-class vehicle having a length larger than the criterion length $L_s$, the determiner 40 determines that a subject vehicle is in a blind spot of the next-lane vehicle when a second condition, in which all side sensors (11~13 in FIG. 2) on the sides of the subject vehicle sense the next-lane vehicle, is satisfied, and determines that the subject vehicle is not in the blind spot of the next-lane vehicle when the second condition is not satisfied.

A method for avoiding a blind spot of a next-lane vehicle using the apparatus for avoiding a blind spot of a next-lane vehicle according to an embodiment is described hereafter.

Figure 6:
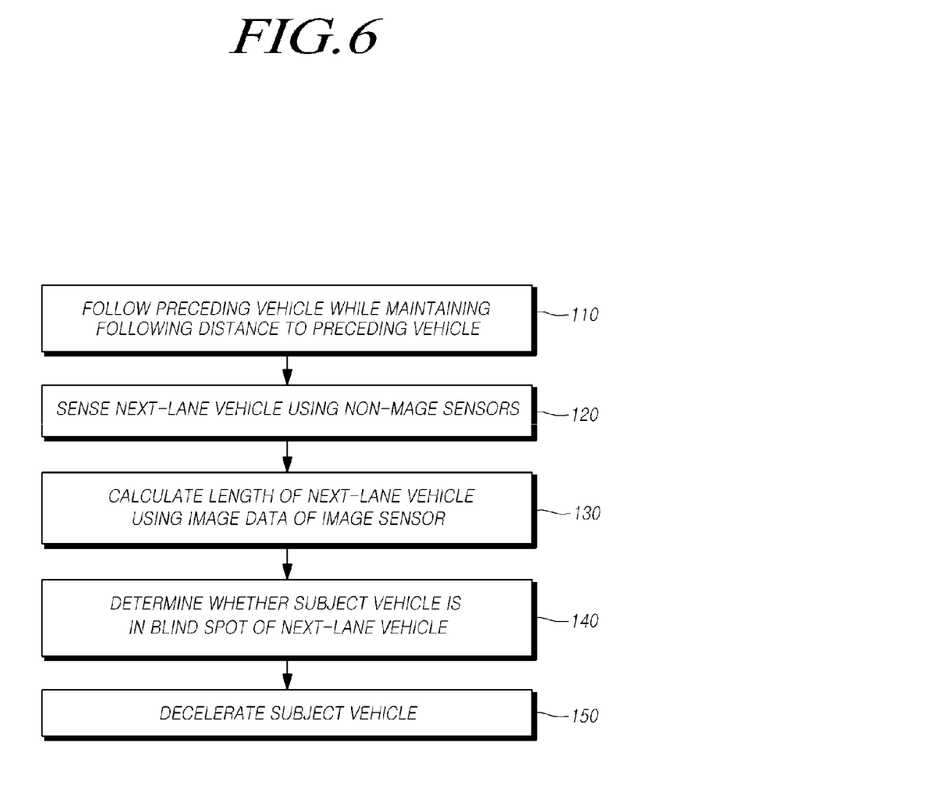
FIG. 6 is a flowchart showing a method for avoiding a blind spot of a next-lane vehicle according to an embodiment.

FIG. 6 is a flowchart showing a method for avoiding a blind spot of a next-lane vehicle according to an embodiment.

Referring to FIG. 6, a method for avoiding a blind spot of a next-lane vehicle according to an embodiment may include steps 110 to 150.

In the step 110, a preceding vehicle is sensed by a preceding vehicle detector (30 in FIG. 1) and a subject vehicle follows the preceding vehicle with the following distance to the preceding vehicle maintained by an adoptive cruise control system (following mode).

In the step 120, a plurality of side sensors that sense objects in the front-cross, central side, and rear-cross areas of the subject vehicle can sense a next-lane vehicle driving in a next lane of the subject vehicle.

In the step 130, a vehicle length detector (20 in FIG. 1) can detect the length of the next-lane vehicle.

In the step 140, a determiner (40 in FIG. 1) can determine whether the subject vehicle is in a blind spot of the next-lane vehicle on the basis of the sensing results of the side sensors 11~13 and the detection result of the vehicle length detector 20.

In detail, when the length of the next-lane vehicle detected by the vehicle length detector 20 is equal to or less than a criterion length $L_s$ as the result of comparing the length of the next-lane vehicle detected by the vehicle length detector 20 with the criterion length $L_s$, the determiner 40 determines that the subject vehicle is in a blind spot of the next-lane vehicle when a first condition, in which the front-cross sensors 11 and the central side sensors 12 of the subject vehicle sense the next-lane vehicle and the rear-cross sensors 13 cannot sense the next-lane vehicle, is satisfied, and determines that the subject vehicle is not in the blind spot of the next-lane vehicle when the first condition is not satisfied.

Further, when the length of the next-lane vehicle detected by the vehicle length detector 20 is larger than the criterion length $L_s$ as the result of comparing the length of the next-lane vehicle detected by the vehicle length detector 20 with the criterion length $L_s$, the determiner 40 determines that the subject vehicle is in a blind spot of the next-lane vehicle when a second condition, in which all the side sensors 11~13 on the sides of the subject vehicle sense the next-lane vehicle, is satisfied, and determines that the subject vehicle is not in the blind spot of the next-lane vehicle when the second condition is not satisfied In the step 150, when the determiner 40 determines that the subject vehicle is in the blind spot of the next-lane vehicle, the controller 50 can decelerate the subject vehicle by controlling the brake system of the subject vehicle.

The controller 50 can limit deceleration of the subject vehicle when the following distance between the subject vehicle and the preceding vehicle detected by the preceding vehicle detector 30 is larger than the maximum allowable following distance that can be allowed in the following mode.

It is possible to control a vehicle to drive while avoiding a blind spot of a next-lane vehicle using the embodiments described above, so it is possible to help safe driving.

Since it is possible to control a vehicle in consideration of blind spots that depend on the lengths of next-lane vehicles, using the embodiments, it is possible to drive while avoiding blind spots regardless of the types of next-lane vehicles.

The above embodiments have been described merely for the purpose of illustrating the technical idea of the present disclosure, and those skilled in the art will appreciate that various modifications and changes are possible without departing from the scope and spirit of the present disclosure. Accordingly, the scope of protection of the present disclosure is not limited by the embodiments disclosed herein, but should be defined by the appended claims, and all equivalents to the technical idea of the claims should be construed as falling within the scope of the present disclosure.

What is claimed is:

1. An apparatus for avoiding of a blind spot of a next-lane vehicle, the apparatus comprising:
   a plurality of side sensors that each comprises a non-image sensor disposed on a subject vehicle to have a sensing area outside the subject vehicle and to capture sensing data and composed of at least one of a radar sensor, a lidar sensor, and an ultrasonic sensor, and at least one processor configured to process sensing data captured by the non-image sensor, and that senses objects in a front-cross, central side, and rear-cross areas of the subject vehicle;
   a vehicle length detector that comprises an image sensor disposed on the subject vehicle to have a visual field outside the subject vehicle and configured to capture image data, and a processor configured to process image data captured by the image sensor, and that detects the length of a next-lane vehicle driving in a next lane of the subject vehicle; and
   a control unit that is configured to control the speed of the subject vehicle at least partially on the basis of processing of the image data and the sensing data,
   wherein the control unit comprises: a determiner that determines whether the subject vehicle is in a blind spot of the next-lane vehicle on the basis of the sensing result of the side sensors and the detection result of the vehicle length detector; and a controller that decelerates the subject vehicle on the basis of the determining result of the determiner,
   wherein the determiner determines that the subject vehicle is in the blind spot of the next-lane vehicle when the sensing results of the side sensors satisfy a first condition if the length of the next-lane vehicle detected by the vehicle length detector is a criterion length or less, and determines that the subject vehicle is in the blind spot of the next-lane vehicle when the sensing results of the side sensors satisfy a second condition if the length of the next-lane vehicle detected by the vehicle length detector is larger than the criterion length, and
   the first condition is a condition in which side sensors configured to sense objects in front-cross and central side areas of the subject vehicle sense the next-lane vehicle and side sensors configured to sense objects in rear-cross areas of the subject vehicle do not sense the next-lane vehicle, and the second condition is a condition in which the side sensors configured to sense objects in the front-cross, central side, and rear-cross areas of the subject vehicle sense the next-lane vehicle.

2. The apparatus of claim 1, wherein the vehicle length detector comprises a camera.

3. The apparatus of claim 1, wherein the criterion length is the sum of the length of the subject vehicle and a predetermined length and the predetermined length has a magnitude that is experimentally determined as a positive value.

4. The apparatus of claim 1, wherein the controller comprises:
   a brake controller that controls a brake system of the subject vehicle to decelerate when the determiner determines that the subject vehicle is in the blind spot of the next-lane vehicle; and
   an engine controller that controls an engine of the subject vehicle.

5. The apparatus of claim 4, further comprising a preceding vehicle detector that senses a preceding vehicle in front of the subject vehicle and detects a following distance between a preceding vehicle and the subject vehicle,
   wherein the controller comprises a deceleration limiter that limits operation of the brake controller when the following distance detected by the preceding vehicle detector exceeds a maximum allowable following distance as a result of comparing the following distance detected by the preceding vehicle detector with the maximum allowable following distance.

6. An apparatus for avoiding of a blind spot of a next-lane vehicle, the apparatus comprising:
a plurality of side sensors that each comprises a non-image sensor disposed on a subject vehicle to have a sensing area outside the subject vehicle and to capture sensing data and composed of at least one of a radar sensor, a lidar sensor, and an ultrasonic sensor;
a vehicle length detector that comprises an image sensor disposed on the subject vehicle to have a visual field outside the subject vehicle and configured to capture image data; and
a domain control unit that is configured to sense objects in front-cross, central side, and rear-cross areas of the subject vehicle, to detect the length of a next-lane vehicle driving in a next lane of the subject vehicle, and to control at least one driver assist system in the subject vehicle, at least partially on the basis of processing of the image data and the sensing data,
wherein the domain control unit determines whether the subject vehicle is in a blind spot of the next-lane vehicle on the basis of the sensing results of the side sensors and the detection result of the vehicle length detector, and decelerates the subject vehicle on the basis of the determining result,
wherein the domain control unit determines that the subject vehicle is in the blind spot of the next-lane vehicle when the sensing results of the side sensors satisfy a first condition if the length of the next-lane vehicle detected by the vehicle length detector is a criterion length or less, and determines that the subject vehicle is in the blind spot of the next-lane vehicle when the sensing results of the side sensors satisfy a second condition if the length of the next-lane vehicle detected by the vehicle length detector is larger than the criterion length, and
the first condition is a condition in which side sensors configured to sense objects in front-cross and central side areas of the subject vehicle sense the next-lane vehicle and side sensors configured to sense objects in rear-cross areas of the subject vehicle do not sense the next-lane vehicle, and the second condition is a condition in which the side sensors configured to sense objects in the front-cross, central side, and rear-cross areas of the subject vehicle sense the next-lane vehicle.

7. The apparatus of claim 6, wherein the vehicle length detector comprises a camera.

8. The apparatus of claim 6, wherein the criterion length is the sum of the length of the subject vehicle and a predetermined length and the predetermined length has a magnitude experimentally determined as a positive value.

9. The apparatus of claim 6, wherein the domain control unit controls a brake system of the subject vehicle to decelerate and controls an engine of the subject vehicle when determining that the subject vehicle is in the blind spot of the next-lane vehicle.

10. The apparatus of claim 9, further comprising a preceding vehicle detector that senses a preceding vehicle in front of the subject vehicle and detects a following distance between a preceding vehicle and the subject vehicle,
wherein the domain control unit limits operation of a brake system when the following distance detected by the preceding vehicle detector exceeds a maximum allowable following distance as a result of comparing the following distance detected by the preceding vehicle detector with the maximum allowable following distance.

11. An image sensor disposed on a subject vehicle to have a visual field outside the subject vehicle and configured to capture image data, wherein the image data is processed by a processor and is then used to detect objects in front-cross, central side, and rear-cross areas of the subject vehicle and to detect the length of a next-lane vehicle driving in a next lane of the subject vehicle, and
object detection information in front-cross, central side, and rear-cross areas of the subject vehicle, and length detection information of the next-lane vehicle is used to determine whether the subject vehicle is in a blind spot of the next-lane vehicle and to decelerate the subject vehicle on the basis of the determining result,
the determining result is determined that the subject vehicle is in the blind spot of the next-lane vehicle when the sensing results of the side sensors satisfy a first condition if the length of the next-lane vehicle detected by the vehicle length detector is a criterion length or less, and the determining result is determined that the subject vehicle is in the blind spot of the next-lane vehicle when the sensing results of the side sensors satisfy a second condition if the length of the next-lane vehicle detected by the vehicle length detector is larger than the criterion length, and
the first condition is a condition in which side sensors configured to sense objects in front-cross and central side areas of the subject vehicle sense the next-lane vehicle and side sensors configured to sense objects in rear-cross areas of the subject vehicle do not sense the next-lane vehicle, and the second condition is a condition in which the side sensors configured to sense objects in the front-cross, central side, and rear-cross areas of the subject vehicle sense the next-lane vehicle.

12. A method of avoiding a blind spot of a next-lane vehicle, the method comprising:
sensing a next-lane vehicle driving in a next lane of a subject vehicle, using a plurality of side sensors that senses objects in front-cross, central side, and rear-cross areas of the subject vehicle;
detecting the length of the next-lane vehicle;
determining whether the subject vehicle is in a blind spot of the next-lane vehicle on the basis of the sensing results of the side sensors and the result of detecting the length of the next-lane vehicle; and
decelerating the subject vehicle on the basis of the detection result,
wherein the determining is performed that the subject vehicle is in the blind spot of the next-lane vehicle when the sensing results of the side sensors satisfy a first condition if the length of the next-lane vehicle detected by the vehicle length detector is a criterion length or less, and the determining is performed that the subject vehicle is in the blind spot of the next-lane vehicle when the sensing results of the side sensors satisfy a second condition if the length of the next-lane vehicle detected by the vehicle length detector is larger than the criterion length, and
the first condition is a condition in which side sensors configured to sense objects in front-cross and central side areas of the subject vehicle sense the next-lane vehicle and side sensors configured to sense objects in rear-cross areas of the subject vehicle do not sense the next-lane vehicle, and the second condition is a condition in which the side sensors configured to sense objects in the front-cross, central side, and rear-cross areas of the subject vehicle sense the next-lane vehicle.

\* \* \* \* \*